United States Patent [19]

Lujan, III et al.

[11] Patent Number: 6,086,310

[45] Date of Patent: Jul. 11, 2000

[54] WHEELED MULTIPURPOSE KEG HANDLER

[76] Inventors: Jesus Lujan, III, 6359 Arce Dr., El Paso, Tex. 79932; Jesus Lujan, Jr., 9876 Lilly Dr., El Paso, Tex. 79927

[21] Appl. No.: 09/212,251

[22] Filed: Dec. 16, 1998

[51] Int. Cl.$^7$ ................................................ B65G 65/24
[52] U.S. Cl. .................... 414/444; 280/40; 280/47.2; 280/79.6; 280/645; 414/448; 414/449
[58] Field of Search .................... 414/444, 448, 414/449, 490; 280/38, 40, 47.2, 47.33, 79.6, 641, 645

[56] References Cited

U.S. PATENT DOCUMENTS

| | | |
|---|---|---|
| 454,448 | 8/1891 | Barley . |
| 1,636,682 | 7/1927 | Carlson ............................ 280/47.33 X |
| 1,738,096 | 12/1929 | Cole ........................................ 414/448 |
| 1,815,825 | 7/1931 | Bates .................................... 414/448 X |
| 1,866,887 | 7/1932 | Gleason et al. ..................... 414/449 X |
| 2,029,656 | 2/1936 | Dawson ................................. 414/448 |
| 2,419,314 | 4/1947 | Donald .................................. 414/448 |
| 3,064,991 | 11/1962 | Huthsing, Jr. . |
| 3,104,889 | 9/1963 | Branch, Jr. ......................... 280/47.2 X |
| 3,862,695 | 1/1975 | Elliot ..................................... 414/448 |
| 4,106,648 | 8/1978 | Dickson . |
| 4,281,844 | 8/1981 | Jackman et al. . |
| 4,335,990 | 6/1982 | Apter et al. . |
| 4,357,029 | 11/1982 | Marini et al. . |
| 4,369,985 | 1/1983 | Bourgraf et al. ................... 280/645 X |
| 4,635,951 | 1/1987 | Berfield et al. . |
| 5,104,135 | 4/1992 | Sheets . |
| 5,290,051 | 3/1994 | Olson . |

FOREIGN PATENT DOCUMENTS

| | | | |
|---|---|---|---|
| 3934475 | 4/1991 | Germany .............................. 414/444 |
| 1782217 | 12/1992 | Russian Federation . |
| 1585229 | 8/1990 | U.S.S.R. ............................... 414/448 |
| 1640077 | 4/1991 | U.S.S.R. ............................... 414/444 |
| 1724506 | 4/1992 | U.S.S.R. . |
| 2274088 | 7/1994 | United Kingdom . |

*Primary Examiner*—James W. Keenan
*Attorney, Agent, or Firm*—Richard C. Litman

[57] ABSTRACT

A four-wheeled multipurpose handtruck is especially adapted to transport a cylindrical object such as a beer keg. A cradle-like frame nests the beer keg and a metal collar secures the keg to the frame. The handtruck employs a curved frame construction which enhances leverage when loading or unloading a keg. Movable rear wheels allow the handtruck to assume a four-wheeled horizontal transport position or the rear wheels may be collapsed for standard two-wheeled transport.

12 Claims, 2 Drawing Sheets

WHEELED MULTIPURPOSE KEG HANDLER

BACKGROUND OF THE INVENTION

1. Field of the Invention

The present invention generally relates to wheeled load carrying apparatus. More specifically, the invention is a handtruck designed to accommodate large cylinders such as beer kegs.

2. Description of the Related Art

Handtrucks having designated structure to accommodate large cylindrical objects are well known in the art and are exemplified in U.S. Pat. No. 454,448 (Barley), U.S. Pat. No. 3,064,991 (Huthsing Jr.), U.S. Pat. No. 4,106,648 (Dickson), U.S. Pat. No. 4,335,990 (Apter), U.S. Pat. No. 4,635,951 (Berfield et al.), U.S. Pat. No. 5,104,135 (Sheets), British Patent number 2,274,088, and Russian Patents numbers 1,724,506 and 1,782,217.

U.S. Pat. No. 4,281,844 (Jackman et al.) shows a three wheeled, steerable vehicle. U.S. Pat. No. 4,357,029 (Marini et al.) shows a cart for transporting trash cans. U.S. Pat. No. 5,290,051 (Olson) shows load-unloading structure for a handtruck.

None of the above inventions and patents, taken either singularly or in combination, is seen to disclose the multipurpose four-wheeled load carrier employing collapsible legs, attachment collar, and curved frame arrangement as will be subsequently described and claimed.

SUMMARY OF THE INVENTION

The present invention is a four-wheeled, dolly-like apparatus capable of lifting, carrying and unloading objects such as kegs, small appliances, or furniture into standard size pickup trucks, vans, or automobile trunks.

The invention is designed for one person operation and utilizes leverage and gravity (weight shift) to successfully perform its functions. In a vertical position, the invention performs like a two-wheeled handtruck. A unique curved frame configuration allows the user to rock the object to be loaded onto and from the handtruck. Upon pulling the rear wheeled legs into a weight bearing position, the handtruck can assume a horizontal orientation for four-wheeled transport of the loaded object to the pickup, etc. for unloading.

The handtruck of the present invention employs a cradle-like frame especially configured to accommodate cylindrical loads such as beer kegs. A flexible collar is used to stabilize the load positioned on the cradle-like frame.

Accordingly, it is a principal object of the invention to provide an improved handtruck having structural components which facilitate the loading and unloading of objects to be transported.

It is another object of the invention to provide an improved handtruck with optional two wheel or four wheel capability.

It is a further object of the invention to provide an improved handtruck which can be employed in either vertical or horizontal position.

It is an object of the invention to provide improved elements and arrangements thereof for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
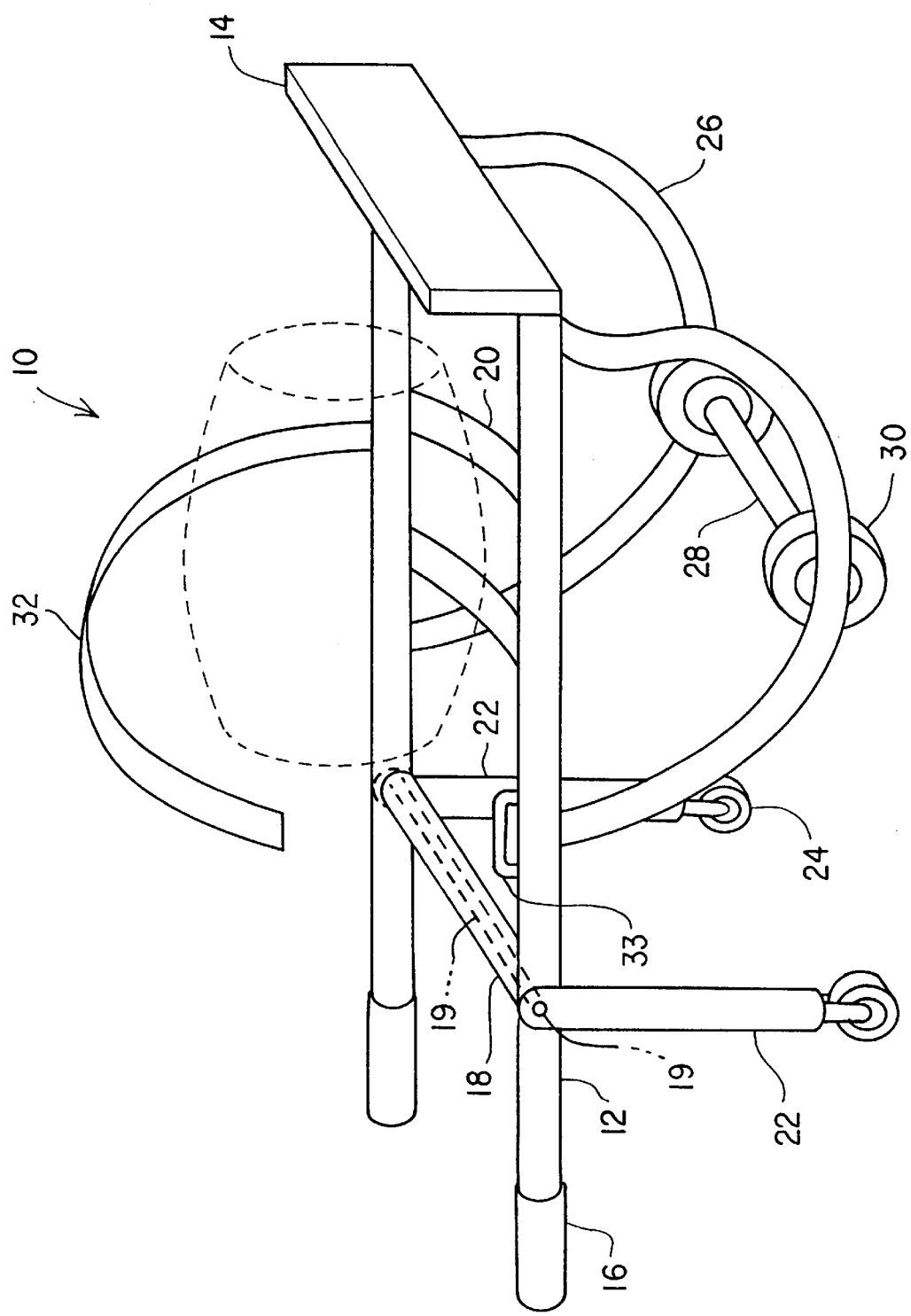
FIG. 1 is an environmental, perspective view of a four-wheeled multipurpose handtruck of the present invention horizontally positioned.
Figure 2:
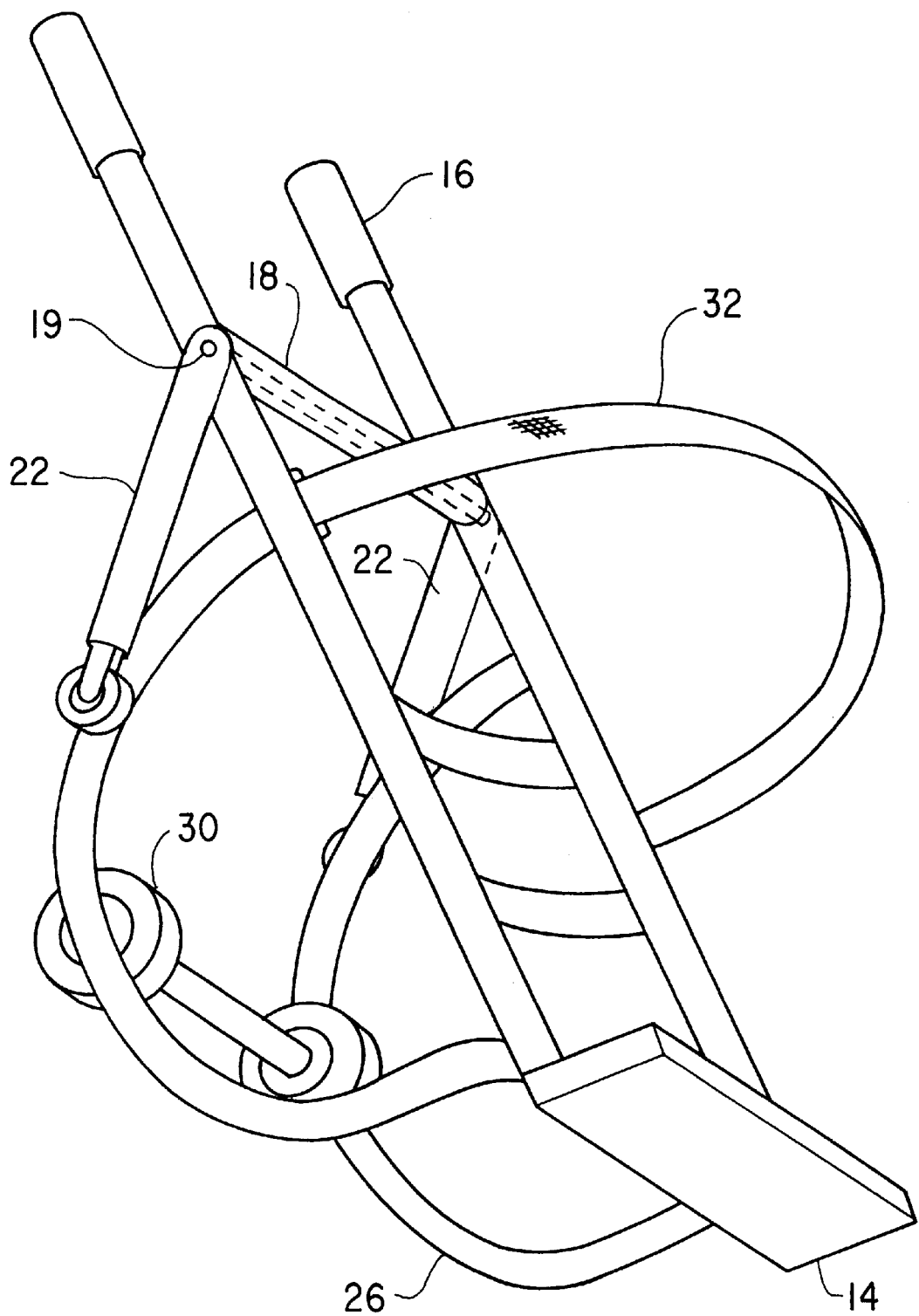
FIG. 2 is a perspective view of the present invention positioned for two wheeled transport.

With reference to FIGS. 1 and 2, the present invention, generally indicated at 10, includes a frame comprising two spaced, rigid side rails 12 fabricated from ¾ inch steel tubing. A load carrying platform or blade 14 joins rails 12 together at a first end. A second end of rails 12 is defined by handles 16. A hollow steel tube 18 is rigidly fastened to rails 12 at a predetermined position between blade 14 and handles 16. Two or more crosspieces 20 join the rails together at spaced intervals between blade 14 and tube 18 as shown. Crosspieces 20 assume an arcuate profile so as to form a cradle for supporting a cylindrical object such as a beer keg (shown in phantom lines).

A rear axle 19 is deployed in hollow tube 18 for pivotal movement therein. In the preferred embodiment, the hollow tube 18 is fixedly attached as a crosspiece between rails 12. Leg members 22 are mounted on the axle 19 (passing through hollow tube 18 and rails 12) and are designed to be pivoted to a load bearing position perpendicular to rails 12, as illustrated in FIG. 1. Three inch swivel wheels 24 are mounted into legs 22 to facilitate movement when leg members 22 are in the load-bearing position. Wheels 24 may be mounted to leg members 22 by any known and convenient means. Leg members 22 may be pivoted to a collapsed position toward rails 12 (FIG. 2) when it is desired to use the handtruck in its two-wheeled mode. It is contemplated that leg members 22 may be locked in both the load-bearing and the retracted positions.

Two tubes 26 extend from respective ends of rails 12 adjacent to blade 14. Tubes 26 are fabricated of one inch hollow steel and are rigidly joined to rails 12. Tubes 26 extend in a curved manner, as shown, from the ends of rails 12 to predetermined positions on the rails between blade 14 and tube 18. With the hand truck in its horizontal position, it can be seen that the lowest point of the curved tubes 26 is traversed by an axle 28. Wheels 30 are mounted for rotation on axle 28. Curved tubes 26 will allow the handtruck to be easily rocked so as to maximize leverage and permit gravity to facilitate loading and unloading by shifting load weight.

Handtruck 10 is provided with a detachable steel collar 32 to retain the beer keg when the handtruck is shifted from a horizontal to a vertical position. Steel collar 32 may be attached to rails 12 in any known convenient and efficient manner i.e. clamp 33. Collars made of nylon or canvas may be used in lieu of steel if desired.

As presently envisioned, the instant invention is dimensioned such that it may be utilized to load and unload objects from carriers such as standard sized pickup trucks or vans. It is recognized, however that the dimensions may be varied to conform to carriers of other sizes.

It is to be understood that the present invention is not limited to the embodiment described above, but encompasses any and all embodiments within the scope of the following claims.

We claim:

1. A wheeled multipurpose handtruck especially adapted to transport a cylindrical load comprising:

a frame incorporating two parallel spaced tubular rails, said rails having first ends and second ends;

a load-bearing platform joining said first ends of said tubular rails, said second ends defining handles;

a hollow tube traversing said rails and rigidly attached thereto, said hollow tube positioned on said rails between said platform and said handles;

first support means pivotally mounted in said hollow tube;

arcuate crosspieces traversing between said rails and rigidly attached thereto, said arcuate crosspieces spaced at intervals between said hollow tube and said load-bearing platform;

leverage enhancing means rigidly attached to said rails;

second support means disposed on said leverage enhancing means; and detachable means for retaining the cylindrical load on said frame.

2. The invention of claim 1 wherein said first support means comprise leg members having free ends, said leg members pivotable between a load bearing position perpendicular to said rails and a folded position substantially proximate to said rails.

3. The invention of claim 2 wherein wheels are mounted in said free ends of said leg members.

4. The invention of claim 3 wherein said wheels are swivel wheels.

5. The invention of claim 1 wherein said leverage enhancing means comprise two parallel curved tubes each curved tube being rigidly attached to a respective one of said rails.

6. The invention of claim 5 wherein each curved tube has a first end and a second end and wherein said first end of each curved tube is rigidly attached to said respective one of said rails at a point closely adjacent said load-bearing platform.

7. The invention of claim 6 wherein said second end of each curved tube is rigidly attached to said respective one of said rails at a point remote from said load-bearing platform.

8. The invention of claim 7 wherein said second support means include an axle traversing said parallel tubes.

9. The invention of claim 8 wherein wheels are mounted on said axle.

10. The invention of claim 1 wherein said detachable means comprises a metal collar.

11. The invention of claim 1 wherein said detachable means comprises a nylon strap.

12. The invention of claim 1 wherein said detachable means comprises a canvas strap.

* * * * *